United States Patent [19]

Jungfer et al.

[11] Patent Number: 4,891,187
[45] Date of Patent: Jan. 2, 1990

[54] PLURAL ABSORPTION STAGES FOR HYDROGEN PURIFICATION

[75] Inventors: Hans Jungfer, Munich; Olaf Brauer, Pullach, both of Fed. Rep. of Germany

[73] Assignee: Linde Aktiengesellschaft, Wiesbaden, Fed. Rep. of Germany

[21] Appl. No.: 662,760

[22] Filed: Oct. 19, 1984

Related U.S. Application Data

[63] Continuation-in-part of Ser. No. 620,786, Jun. 15, 1984, abandoned.

[30] Foreign Application Priority Data

Jun. 16, 1983 [DE] Fed. Rep. of Germany ....... 3321909

[51] Int. Cl.$^4$ ............. C01B 1/26; C01B 3/24
[52] U.S. Cl. ........................... 423/248; 55/68; 423/650
[58] Field of Search ............ 423/650, 248; 55/68

[56] References Cited

U.S. PATENT DOCUMENTS

| | | | |
|---|---|---|---|
| 3,382,044 | 5/1968 | Cromeans | 55/75 |
| 4,213,954 | 7/1980 | Pinto | 422/148 |
| 4,238,468 | 12/1980 | Bonacci et al. | 423/362 |
| 4,409,196 | 10/1983 | Skinner et al. | 252/373 |

OTHER PUBLICATIONS

"Ammonia Plant Productivity Boosted by Selective CO Oxidation," C. M. Buckthorp, *Nitrogen*, May/Jun. 1978, pp. 34–39.

*Primary Examiner*—John Doll
*Assistant Examiner*—Wayne A. Langel
*Attorney, Agent, or Firm*—Millen, White & Zelano

[57] ABSTRACT

For the production of hydrogen, hydrocarbons are subjected to a partial oxidation, the resulting gaseous fraction is fed to a CO shift conversion and the acid gases are removed by absorption. To obtain a $H_2$ product with a purity of at least 99% by volume without reduction in yield, sulfur compounds are removed in a first absorption stage with an organic, physical solvent; the resultant desulfurized gas is subjected to a selective catalytic oxidation with oxygen to selectively convert CO to $CO_2$, and resultant desulfurized CO-depleted gas is treated in a second absorption stage with preferably the same scrubbing agent as first absorption stage to remove $CO_2$.

12 Claims, 2 Drawing Sheets

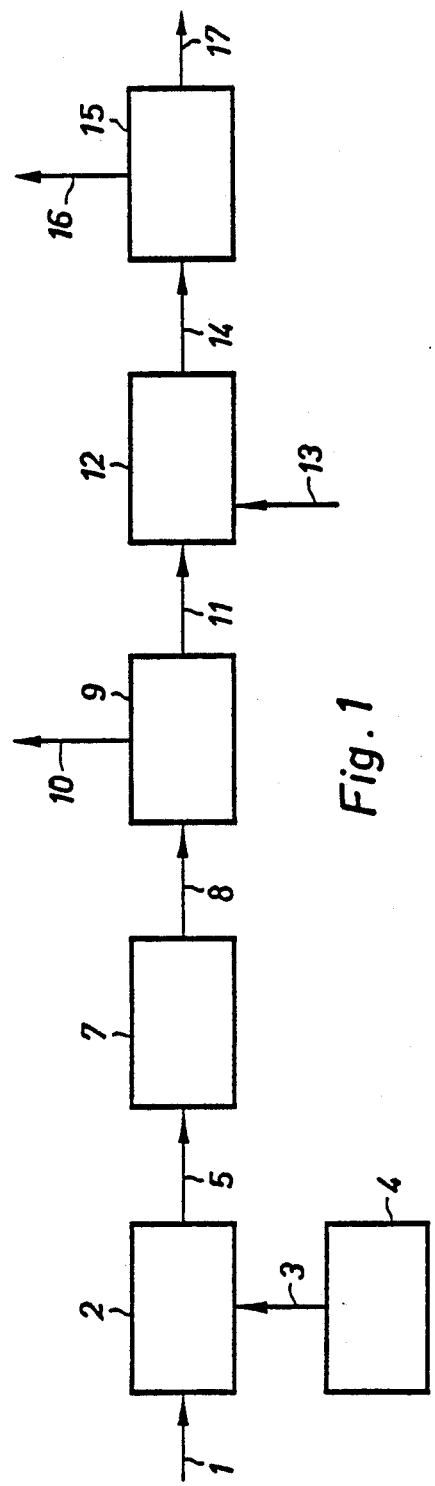
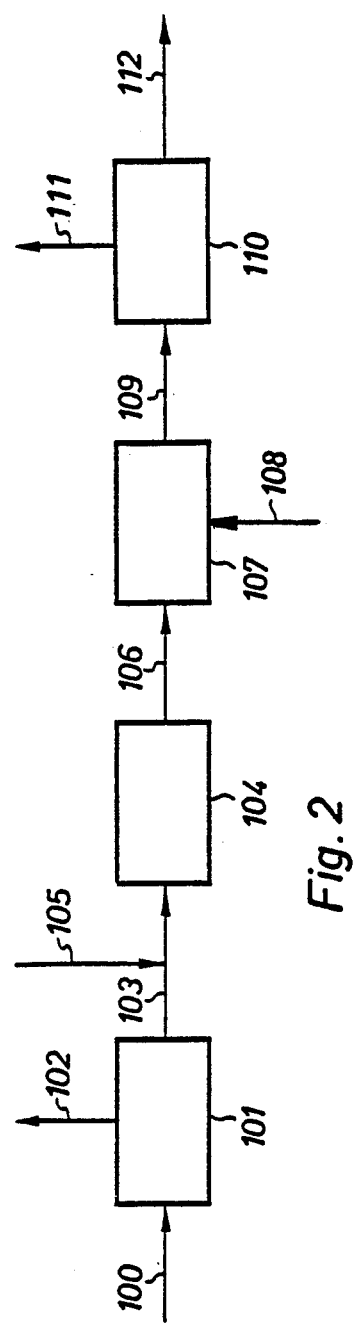
Fig. 1
Fig. 2

PLURAL ABSORPTION STAGES FOR HYDROGEN PURIFICATION

CROSS-REFERENCE TO RELATED APPLICATION

This is a continuation-in-part application of applicants' co-pending application Ser. No. 620,786, filed June 15, 1984, entitled "Plural Absorption Stages for Hydrogen Purification" now abandoned.

BACKGROUND OF THE INVENTION

This invention relates to a hydrogen purification process, and especially to a process wherein hydrogen is produced from hydrocarbons by partial oxidation, the resulting gaseous fraction is fed to a CO conversion unit, and the acid gases are removed by scrubbing.

The production of hydrogen by partial oxidation of, e.g., fuel gases, fuel oils, residues or coal comprises the process steps of: (a) synthesis gas formation alternatively termed gasification; and (b) CO shift conversion. In the gasification step, a gas consisting essentially of $H_2$, CO, $CO_2$, $H_2O$ and inert gases is obtained. The equilibrium conditions for the CO shift conversion generally are reached at a high temperature, e.g. 1400° C. in the gasification reactor. When heavy oil is used, $H_2$ and CO are contained in the gas in about equal parts. To maintain the resultant equilibrium conditions, the crude gas is cooled rapidly by direct and/or indirect quenching. To raise the $H_2$ yield, the resultant gas is passed to the shift converter where it is saturated with steam and the CO therein is catalytically converted to $CO_2$ and $H_2$. Then the gas is cooled, the excess steam condensed out and the gas fed to the $H_2S$ removal and then to the $CO_2$ removal, which preferably is performed by absorption with an organic, physical solvent. (A physical solvent is a solvent which does not enter into a chemical reaction with any components of the system). For additional details of the production of hydrogen by partial oxidation, reference is invited to the literature, e.g, Faith, Keyes and Clark's "Industrial Chemicals", Fourth Edition, Lowenheim and Moran, John Wiley & Sons, N.Y. 1975, pages 470, 471, 469, incorporated by reference herein.

By the process, a product with a purity of 97 to 98.5% hydrogen is obtained. With subsequent methanation, the CO and $CO_2$ content can be reduced to values less than 10 ppm, but at the expense of a lowered yield of $H_2$ which is consumed in the catalytic methanation reaction. Instead of methanation, a pressure swing adsorption installation can be used, with which a hydrogen purity of up to 99.99% by volume is achieved, but with about 10% of the amount of product lost. The pressure swing adsorption installation reaches its limits of economical use in the case of high product pressures about 40 bar which, however, are desirable in various cases, i.e. $NH_3$-synthesis, hydrogenation and desulfurization.

SUMMARY

An object of one aspect of this invention is to provide a hydrogen purification process wherein an $H_2$ product with a purity of at least 99% by volume is produced, without any reduction in the yield of hydrogen.

An object of another aspect of this invention is to provide such a purification process in conjunction with the partial oxidation process for the production of hydrogen.

Upon further study of the specification and appended claims, further objects and advantages of this invention will become apparent to those skilled in the art.

To attain these objects, a process is provided wherein in a first absorption stage the sulfur compounds are removed with an organic, physical solvent, the resultant desulfurized gas is subjected to a selective catalytic CO oxidation, and the resultant gas is freed of $CO_2$ with an organic, physical solvent in a second absorption stage. Our investigations have shown that by a combination of an acid gas absorption with a selective catalytic CO oxidation, a surprising synergistic effect occurs. Removal of the sulfur compounds before the catalytic oxidation of CO to $CO_2$ is a prerequisite for use of a special, highly selective catalyst, which in the presence of oxygen makes possible the reaction

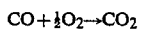

while at the same time the reaction

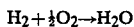

is reduced to a minimum. Thus the overwhelming part of the CO is converted to $CO_2$, which is removed from the gas in the following scrubbing stage. Such special highly selective catalysts have been used by others in the U.S. and do not constitute a contribution of this invention. They are, e.g., Pt and Rh/Pd based catalysts with a carrier material of aluminium oxide, e.g., made by a proprietary manufacturing process. In particular, the "Selectoxo" catalyst, Engelhard Industries Division of Engelhard Minerals & Chemicals Corp., is a catalyst that can be used beneficially in the present invention; see Buckthorp, "Ammonia Plant Productivity Boosted by Selective CO Oxidation", Nitrogen, May/June 1978, pp. 34–39.

A sulfur absorbing protective packing, e.g., iron oxide or zinc oxide, is advantageously installed upstream to protect the oxidation catalyst, the prefered arrangement is in a separate vessel according to standard engineering practice.

With the combination according to the invention of plural gas scrubbing steps with a selective catalytic CO oxidation, an $H_2$ purity of over 99% by volume, especially up to 99.5% by volume, is obtained. This high product purity is fully satisfactory for most technical uses.

There are several alternatives for conducting the process of the invention. According to one embodiment of the process according to the invention, the sulfur compounds can be removed from the gas resulting from the CO shift conversion. Alternatively, it is possible to remove the sulfur compounds from the upstream synthesis gas resulting from the partial oxidation, feed the desulfurized gas to the CO shift conversion and then feed the converted gas to the CO catalytic oxidation step.

It is advantageous to use the solvent resulting from the second absorption stage, charged with $CO_2$, to absorb the sulfur compounds in the first absorption stage. Savings in regard to the regeneration of this solvent can be achieved by using a single absorption agent circuit.

Absorption of the sulfur compounds is performed with particular advantage at temperatures below 0° C. The desulfurized gas is then heated to ambient temperature and, after CO oxidation, is cooled to the absorption temperature of below 0° C. in the second absorption stage. Thus, advantageously, the desulfurized gas from the first absorption stage is heated in heat exchange with the gas to be desulfurized and, after selective CO oxidation, is again cooled in heat exchange with the $H_2$ product of the second absorption stage.

All physical absorption agents, which particularly exhibit a selectivity for $H_2S$ as against $CO_2$, can be used as solvents in the process according to the invention. In particular, they are, among others, methyl alcohol, ketones, N-methylpyrrolidone, dimethylformamide, glycols, aromatic hydrocarbons, butyrolactone.

In general, the purification process of this invention is useful for the purifying of any gas containing hydrogen, sulfur compounds and CO, whether obtained by partial oxidation or not, the volumetric concentration of these components being generally about 50 to 90 % hydrogen, 0.1 to 5 % sulfur compounds and 0.2 to 2.0 % CO.

Depending on requirements, the gas freed of $CO_2$ can in a further embodiment be subjected to a methanation step to obtain higher purity products. In this case, the $H_2$ requirement for methanation is reduced by the upstream catalytic CO oxidation and subsequent absorption of $CO_2$, which thereby leads to an improved product yield. Thus, with respect to $H_2$ yield, a pressure swing adsorption installation is about 10% poorer in yield than the alternative with methanation.

BRIEF DESCRIPTION OF DRAWINGS

FIGS. 1 and 2 are block diagrams showing two embodiments for conducting the process of the invention wherein FIG. 1 employs the sulfur compound absorption step after the shift converter, and FIG. 2 before the shift converter step.

DETAILED DESCRIPTION

Figure 3:
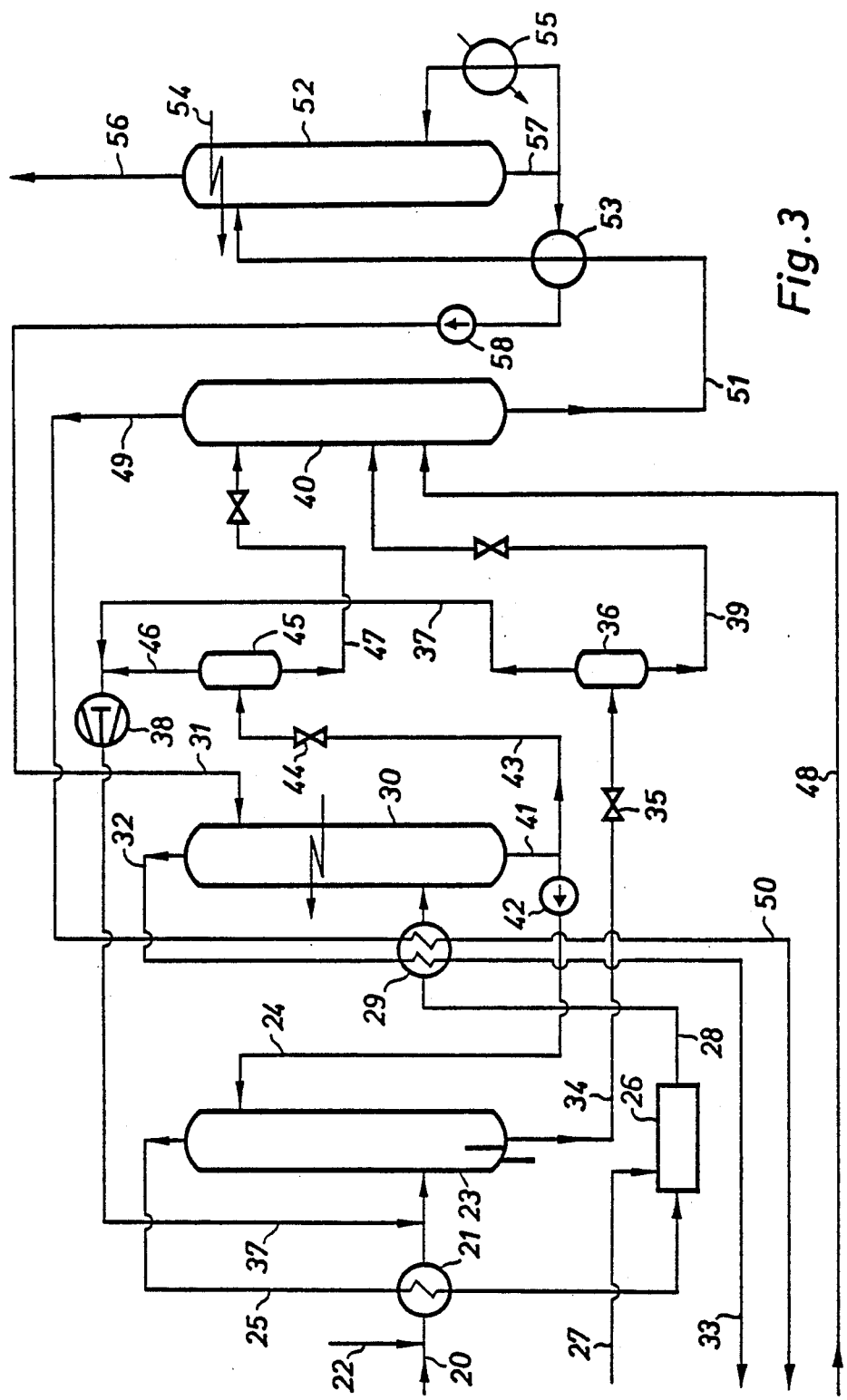
FIG. 3 is a schematic flowsheet of a preferred embodiment of the details of the absorption and regeneration steps of the invention.

According to FIG. 1, hydrocarbons are fed from pipe 1 to a synthesis gas unit 2. In the presence of oxygen, which, for example, is fed from an air fractionation unit 4 by pipe 3, the hydrocarbons are oxidized at temperatures of over 1200° C. essentially into $H_2$, CO and $CO_2$ which are withdrawn via pipe 5.

The synthesis gas in pipe 5, is fed to a CO shift converter 7, in which CO is catalytically reacted with $H_2O$ to form $CO_2$ and $H_2$ at temperatures between 200 and 500° C., in one or more stages, the preferred catalyst being based on Co/Mo sulfides.

The converted gas, essentially containing $H_2$, $CO_2$, steam, $H_2S$ and inert gases is passed via pipe 8 to a first absorption stage 9, in which the sulfur compounds, $H_2S$ and COS are selectively removed from the gas with an organic, physical solvent, and withdrawn via pipe 10. The resultant gas, thus desulfurized, is fed via pipe 11 to a selective catalytic CO oxidation stage 12, which is supplied by pipe 13 with oxygen, the latter being provided optionally by air fractionation unit 4.

The gas, essentially free of CO, is then fed via pipe 14 to the second absorption stage 15, in which all the $CO_2$ is absorbed from the gas and removed via pipe 16. The $H_2$ product is withdrawn via pipe 17.

According to FIG. 2, gas is fed by pipe 100 from a partial oxidation to a first absorption stage 101 and there is selectively freed of $H_2S$ and COS with an organic, physical solvent. The sulfur compounds are removed via pipe 102. The desulfurized gas is fed via pipe 103 to CO shift conversion unit 104, which can consist of a high temperature and a low temperature stage. The water needed for CO conversion is fed by pipe 105.

FIGS. 1 and 2 present established, process routes for gas treatment downstream petroleum oxidation units. They differ in the shift catalyst, which in FIG. 1 is sulfur resistant, consequently $H_2S$ and $CO_2$ are removed in a one stage rectisol unit, with the intermediate catalytic stage.

In FIG. 2, $H_2S$ is removed in front of the shift catalyst and the oxidation step can be arranged immediately downstream the shift coolers. The preferred route is selected according to overall process requirements independent from the catalytic oxidation step.

The converted gas is then fed via pipe 106 to selective, catalytic CO oxidation 107, which is supplied with oxygen by pipe 108. The gas, essentially free of CO, is then fed via pipe 109 to the second absorption stage 110, in which all the $CO_2$ is removed from the gas and carried off via pipe 111. The $H_2$ product stream is withdrawn via pipe 112.

In FIG. 3, the process steps relating to the absorption process and CO oxidation are illustrated in detail, using a rectisol absorption technique as an example.

A typical cracked gas having a temperature of about 30° C. and a pressure of 70 bars, resulting from the shift CO conversion and already precooled, is introduced via pipe 20. The cracked gas is mainly comprised of $H_2$ and $CO_2$ but also contains CO, $H_2S$ and water. The cracked gas is cooled to about $-20°$ C. in a heat exchanger 21. To prevent fouling of the apparatus with water ice, the crude gas is injected with methyl alcohol by pipe 22 before cooling. The precooled cracked gas is then scrubbed for the removal of hydrogen sulfide in a first absorption column 23. The $H_2S$ is scrubbed countercurrently in the absorption column with cold methyl alcohol introduced at a temperature of about $-30°$ C. via pipe 24.

The desulfurized gas is passed via pipe 25 to heat exchanger 21 in which it is heated to about ambient temperature. The heated gas is passed to a catalytic oxidation unit 26, in which CO is selectively oxidized to $CO_2$ in the presence of oxygen introduced via conduit 27. The gas stream, essentially free of CO, is withdrawn from oxidation stage 26 via pipe 28 and, after cooling to about $-20°$ C. in a heat exchanger 29, is fed to a second absorption column 30. In this column, the $CO_2$ is absorbed by cold methyl alcohol (at about $-50°$ C.) via pipe 31. An $H_2$ product stream having a temperature of $-50°$ C. is withdrawn via pipe 32 from the head of the column, is heated in a heat exchanger 29 and is removed from the process via conduit 33. Optionally, this product stream can be further treated in a conventional methanation unit which is not shown. See Slack/James Amonia part II, pg. 311, Marcel Dekker, NY, 1974.

The methyl alcohol, charged with hydrogen sulfide from the first absorption column 23, is fed via pipe 34 and expansion valve 35 to a phase separator 36. By expansion to 25 bars in the expansion valve, most of the $H_2$ also dissolved in the methyl alcohol is removed from the solvent. The expanded gas is returned via pipe 37 and recycle compressor 38 to crude gas stream 20 after cooling. The resultant methyl alcohol from phase separator 36 is delivered by pipe 39 into the middle of a hydrogen sulfide concentration column 40.

The methyl alcohol, charged with $CO_2$ from the second absorption column 30 is withdrawn via pipe 41, and one part, about 40 to 60 %, after pumping in pump 42 to the operating pressure of the first absorption column 23, is recycled thereto via pipe 24. The other part is fed via pipe 43 and expansion valve 44 to phase separator 45, which has the same purpose as separator 36. The freed hydrogen is removed therefrom via pipe 46 and mixed with the hydrogen in pipe 37. The resultant methyl alcohol, charged with $CO_2$ is delivered via pipe 47 into the upper part of the $H_2S$ concentration column.

Via pipe 48, into the bottom of the $H_2S$ concentration column 40, is introduced a stripping gas, e.g., nitrogen, which functions to drive off the $CO_2$ dissolved in the methyl alcohol. The resultant $CO_2$, together with $N_2$, is withdrawn from the head of column 40 via pipe 49 as residual gas, thereafter heated in heat exchanger 29 to ambient temperature and then withdrawn via conduit 50.

The methyl alcohol, charged with $H_2S$ and a residual $CO_2$ content, is withdrawn from the bottom of column 40 via pipe 51 and introduced to regeneration column 52 after heating in heat exchanger 53. Regeneration column 52 is provided with cooling 54 at the head and a closed heating system 55 at the bottom. In regeneration column 52, the methyl alcohol is freed of $H_2S$ and $CO_2$. The $H_2S$ fraction is withdrawn via pipe 65 as a highly concentrated head product. The regenerated methyl alcohol is passed through pipe 57 from the bottom of regeneration column 52 to heat exchanger 53 and from there by a pump 58 and pipe 31 to the second absorption column 30.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

| $Nm^3h$ | Partial oxidation of asphalt | | | | | |
|---|---|---|---|---|---|---|
| | 1 | 2 | 3 | 4 | 5 | 6 |
| $H_2$ | 62300 | 62000 | 61900 | 60380 | 61630 | 55800 |
| CO | 500 | 500 | 50 | — | — | — |
| Inert gases | 230 | 230 | 230 | 260 | 310 | 5 |
| $CO_2$ | 35970 | 30 | 30 | — | — | — |
| $H_2S$ | 1000 | — | — | — | — | — |
| Total | 100000 | 62760 | 62210 | 61140 | 61940 | 55805 |
| P[bar] | 55 | 52 | 51 | 51 | 50 | 51 |
| T[°C.] | 40 | 30 | 30 | 40 | 40 | 30 |
| Vol. % $H_2$ | 62.3 | 98.8 | 99.5 | 98.8 | 99.5 | 99.99 |
| Yield % $H_2$ | 100 | 99.5 | 99.4 | 96.9 | 98.9 | 89.6 |

1. Crude gas after 3-stage conversion and cooling
2. Crude $H_2$ after acid gas absorption
3. Like 2, with catalytic CO oxidation
4. Pure $H_2$ after methanation
5. Like 4, with catalytic CO oxidation
6. Pure $H_2$ after purification in pressure swing adsorption installation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for the production of hydrogen from sulfur containing hydrocarbons, wherein hydrocarbons are subjected to a partial oxidation to form a synthesis gas containing $H_2$, CO, $CO_2$, $H_2S$ and COS, the resulting gaseous fraction is subjected to a CO shift conversion with steam, and the acid gases are removed by absorption, the improvement which comprises removing sulfur compounds in a first absorption stage with an organic, physical solvent, subjecting the desulfurized gas to a selective catalytic CO oxidation step with oxygen, the catalyst employed in said step being effective for the selective oxidation of CO to $CO_2$ in the presence of hydrogen, and then subjecting the resultant desulfurized Co-depleted gas to a second absorption stage with an organic, physical solvent to remove the $CO_2$ wherein the solvent from the second absorption stage, charged with $CO_2$, is used partly for absorption of the sulfur compounds in the first absorption stage.

2. A process according to claim 1, wherein the sulfur compounds are removed from the gas after the CO shift conversion step.

3. A process according to claim 1, wherein the sulfur compounds are removed from the synthesis gas resulting from the partial oxidation and before the shift conversion reaction.

4. A process according to claim 1, wherein the absorption of the sulfur compounds is performed at temperatures below 0° C., the desulfurized gas is heated to ambient temperature and, after selective catalytic CO oxidation, cooled to the absorption temperature, below 0° C., of the second absorption stage.

5. A process according to claim 2, wherein the absorption of the sulfur compounds is performed at temperatures below 0° C., the desulfurized gas is heated to ambient temperature and, after selective catalytic CO oxidation, cooled to the absorption temperature, below 0° C., of the second absorption stage.

6. A process according to claim 3, wherein the absorption of the sulfur compounds is performed at temperatures below 0° C., the desulfurized gas is heated to ambient temperature and, after selective catalytic CO oxidation, cooled to the absorption temperature, below 0° C., of the second absorption stage.

7. A process according to claim 4, wherein the desulfurized gas from the first absorption stage is heated in heat exchange with the gas to be desulfurized and, after selective CO oxidation, again cooled in heat exchange with $H_2$ product from the second absorption stage.

8. A process according to claim 5, wherein the desulfurized gas from the first absorption stage is heated in heat exchange with the gas to be desulfurized and, after selective CO oxidation, again cooled in heat exchange with $H_2$ product from the second absorption stage.

9. A process according to claim 3, wherein the desulfurized gas from the first absorption stage is heated in heat exchange with the gas to be desulfurized and, after selective CO oxidation, again cooled in heat exchange with $H_2$ product from the second absorption stage.

10. A process according to claim 1, wherein the resultant gas, freed of $CO_2$ is further subjected to a methanation step to remove residual carbon oxides and further increase the purity of the hydrogen product.

11. A process according to claim 1, wherein the organic physical solvent is methanol.

12. In a process for the purification of hydrogen from a gas containing 50 to 90% hydrogen, 0.1 to 5% sulfur compound and 0.2 to 2.0% CO, by volume, wherein the gas is subjected to a CO shift conversion with steam, and the acid gases are removed by absorption, the improvement which comprises removing sulfur compounds in a first absorption stage with an organic, physical solvent, subjecting the desulfurized gas to a selective catalytic CO oxidation step with oxygen the catalyst employed in said step being effective for the selective oxidation of CO to $CO_2$ in the presence of hydrogen, and then subjecting the resultant desulfurized CO-depleted gas to a second absorption stage with an organic, physical solvent to remove the $CO_2$, wherein the solvent from the second absorption stage, charged with $CO_2$, is used partly for absorption of the sulfur compounds in the first absorption stage.

* * * * *